United States Patent [19]

Saito et al.

[11] Patent Number: 5,276,560
[45] Date of Patent: Jan. 4, 1994

[54] ROTARY MAGNETIC TYPE RECORDING APPARATUS

[75] Inventors: Isao Saito, Kanagawa; Keitaro Yamashita, Tokyo, both of Japan

[73] Assignee: Sony Corporation, Tokyo, Japan

[21] Appl. No.: 711,891

[22] Filed: Jun. 7, 1991

[30] Foreign Application Priority Data

Jun. 15, 1990 [JP] Japan ................... 2-156963

[51] Int. Cl.⁵ .................................................. G11B 5/02
[52] U.S. Cl. ................................... 360/19.1; 358/343
[58] Field of Search ................. 360/19.1, 18; 358/343

[56] References Cited

U.S. PATENT DOCUMENTS

| | | | |
|---|---|---|---|
| 4,303,950 | 12/1981 | Taniguchi et al. | 360/19.1 |
| 4,549,229 | 10/1985 | Nakano et al. | 360/19.1 |
| 4,672,467 | 6/1987 | Heitmann | 360/19.1 |
| 4,772,960 | 9/1988 | Takahash et al. | 360/19.1 |
| 5,012,361 | 4/1991 | Chiba et al. | 360/19.1 |
| 5,132,807 | 7/1992 | Takimoto et al. | 358/343 |

Primary Examiner—Edward P. Westin
Assistant Examiner—Jon Santamauro
Attorney, Agent, or Firm—William S. Frommer; Alvin Sinderbrand

[57] ABSTRACT

A video tape recording apparatus includes a rotary magnetic head for scanning skewed recording tracks on a video tape, a device for recording a video signal in each of the recording tracks by the rotary magnetic head, a device for providing a first guard band area in each of the recording tracks next to the video signal recorded in the respective recording track, a device for recording a first audio signal next to the first guard band area by the rotary magnetic head, a device for providing a second guard band area next to the first audio signal in each of the recording tracks with the second guard band area having a length different from the length of the first guard band area, a device for recording a second audio signal next to the second guard band area by the rotary magnetic head, and a device for recording an index signal in a longer one of the first and second guard band areas by the rotary magnetic head.

6 Claims, 5 Drawing Sheets

FIG. 4A (14) 
FIG. 4B (15) 
FIG. 4C (16) 
FIG. 4D (19) 
FIG. 4E (17) 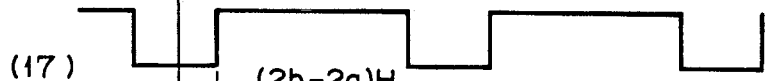
$(2b-2a)H$
FIG. 4F (20) 
FIG. 4G (18) 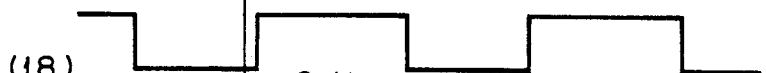
$2aH$
FIG. 4H (21) 
FIG. 4I (22) 
FIG. 4J (23) 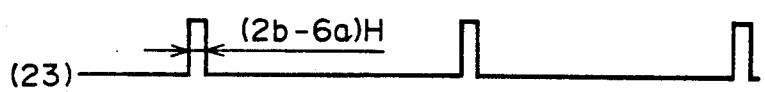
$(2b-6a)H$

ROTARY MAGNETIC TYPE RECORDING APPARATUS

BACKGROUND OF THE INVENTION

1. Field of the Invention

The present invention relates to a video tape recording apparatus and more particularly to a rotary magnetic head type recording apparatus to be applied to a commercially-available high definition video tape recorder, for example.

2. Description of the Prior Art

In a commercially-available high definition video tape recorder (hereinafter simply referred to as a VTR), for example, both a video signal and a PCM (pulse code modulated) audio signal are recorded on a magnetic tape by using a rotary magnetic head, wherein the audio signal is composed of two systems each of which includes two channels of audio signals, that is, four channels of audio signals in total.

It has been proposed to enable in a VTR an operation such as a high-speed program search in a reproducing mode by providing an index signal which is recorded and reproduced by a rotary magnetic head. In this case, it has been proposed to provide a recording area for the index signal at a non-effective picture portion of the video signal or at a data portion for the PCM audio signal. However, if the recording area of the index signal is provided at these areas, the index signal cannot be erased or rewritten and also a new index signal cannot be added, thereby strictly limiting the flexibility of the index signal.

On the other hand, in VTRs where recording areas of the video signal and the audio signal are separately provided, it has been proposed to record the index signal by using an area between the recording areas of the video and audio signals, that is, a guard band area. Namely, if the video signal and the two systems of audio signals as described above are recorded, a recording pattern thereof on a tape T will be such as shown in FIG. 1. As shown in FIG. 1, a guard band area with a predetermined length with respect to the scanning direction of the head is provided in each of areas between the recording area of the video signal and the recording area of the audio signal and also between the recording areas of the two systems of audio signals, and it has been proposed to record an index signal by using these guard band areas.

However, in this case, the following problems arise.

Namely, signals forming respective recording areas on a track are generally formed with reference to a signal generated from a pulse generator (PG) or a frequency generator (FG) provided on a rotary head drum, so that a timing deviation when the signals are formed may cause a recording deviation from a position on a tape where the signals should be recorded. The reasons for the deviation include an adjustment error of a rotary head type recording and/or reproducing apparatus, change of a timing signal due to aging of an apparatus, change of a tape running state due to changes in relationships between a tape and an apparatus caused by aging, or differences in running states among compatible apparatus, etc. Thus, this recording deviation is recognized as a tolerance in a tape format.

Accordingly, positions of respective recording areas on a tape vary within a tolerance due to aging changes, etc., so that there is a possibility that the length of a guard band area may decrease due to an operation of after-recording and so on.

Namely, suppose that a recording pattern of video and audio signals recorded by a first apparatus deviates by $+aH$ as shown in FIG. 2A, where $\pm aH$ represents the above described tolerance and H represents the horizontal synchronizing period, while a recording pattern of a first audio signal recorded by an after-recording operation using a second apparatus deviates by $-aH$ as shown in FIG. 2B. Then, the recording pattern of the video and both audio signals is as shown in FIG. 2C, wherein a length of the remaining guard band area is only $(b-2a)H$, where $bH$ represents the reference length of the guard band area.

Further, in case of subsequent recording of an index signal in the guard band area, an additional tolerance due to the recording of the index signal must be taken into consideration, so that a length of the guard band area where the index signal can be recorded will be only $(b-4a)H$.

If a length necessary for recording the index signal is 1H, then the length of the guard band area is required to be $(bH=(1+4a)H$ in view of the above described tolerances, where $bH$ represents the reference length of the guard band area. However, if a guard band area with this long length is provided as the reference guard band area, then the recording areas of the audio and video signals must be shortened disadvantageously.

OBJECTS AND SUMMARY OF THE INVENTION

Accordingly, it is a general object of the present invention to provide an improved rotary head type recording apparatus in which the aforementioned shortcomings and disadvantages of the prior art can be eliminated.

More specifically, it is an object of the present invention to provide an improved rotary head type recording apparatus which is capable of re-recording a rewritable index signal with simplified circuit configurations.

According to an aspect of the present invention, a video tape recording apparatus is comprised of a rotary magnetic head for scanning skewed recording tracks on a video tape, a device for recording a video signal in each of the recording tracks by the rotary magnetic head, a device for providing a first guard band area in each of the recording tracks next to the video signal recorded in the respective recording track, a device for recording a first audio signal next to the first guard band area by the rotary magnetic head, a device for providing a second guard band area next to the first audio signal in each of the recording tracks with the second guard band area having a length different from the length of the first guard band area, a device for recording a second audio signal next to the second guard band area by the rotary magnetic head, and a device for recording an index signal in a longer one of the first and second guard band areas by the rotary magnetic head.

The above and other objects, features, and advantages of the present invention will become apparent from the following detailed description of an illustrative embodiment thereof to be read in conjunction with the accompanying drawings, in which like reference numerals represent the same or similar elements and parts.

BRIEF DESCRIPTION OF THE DRAWINGS

FIGS. 4A to 4J are timing charts illustrating waveforms for explaining operations of the embodiment of FIG. 3.

DETAILED DESCRIPTION OF THE PREFERRED EMBODIMENT

A preferred embodiment of the present invention will now be described with reference to the accompanying drawings.

Figure 1:
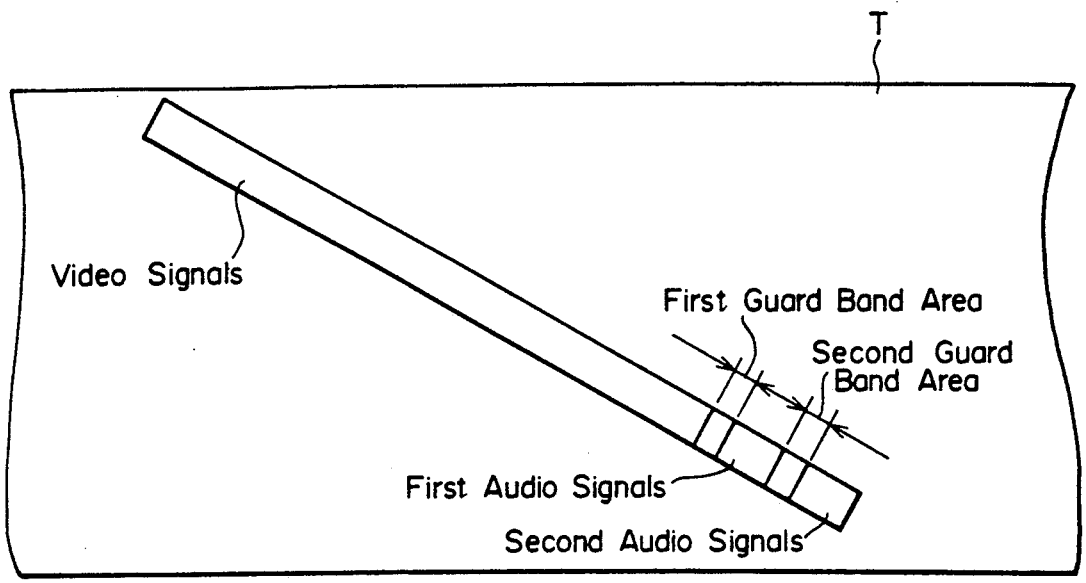
FIG. 1 is a diagram illustrating an example of a conventional recording pattern on a tape.
Figure 2:
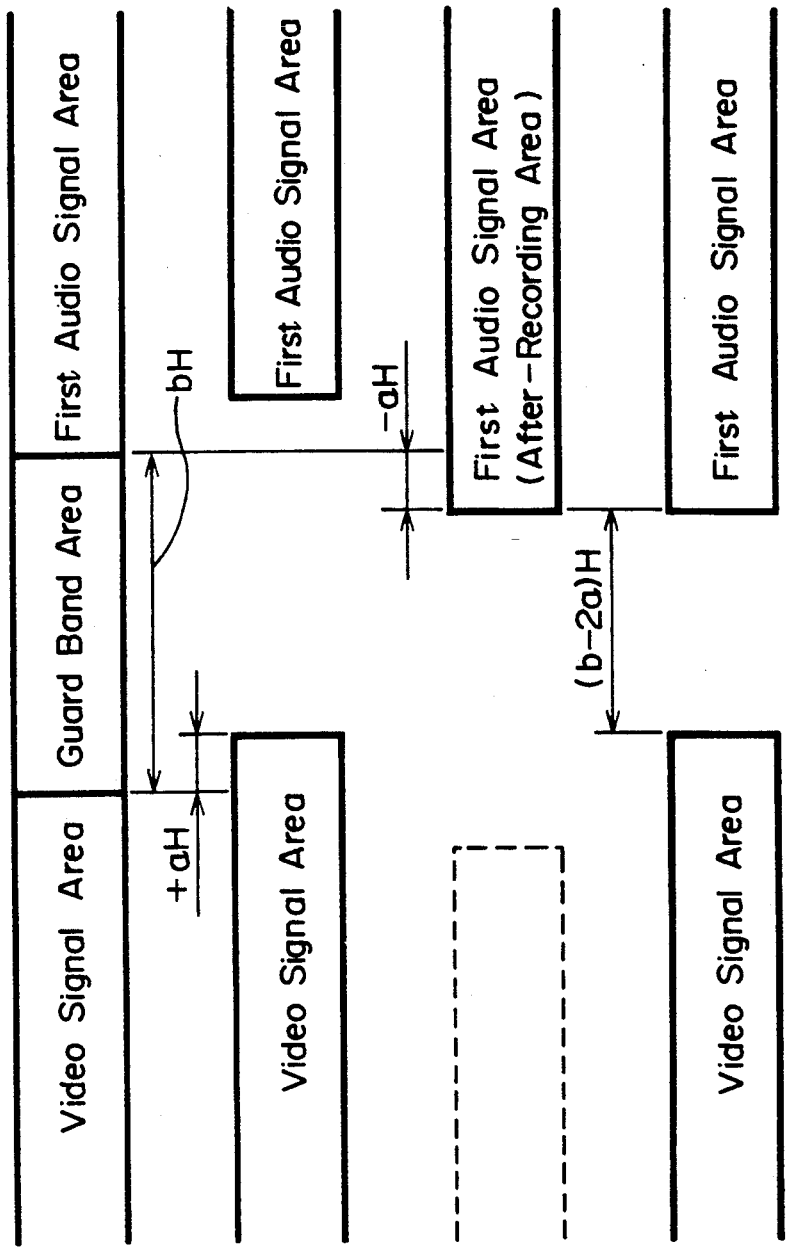
FIGS. 2A to 2C are diagrams for explaining a change in length of a guard band pattern due to recording signals.
Figure 3:
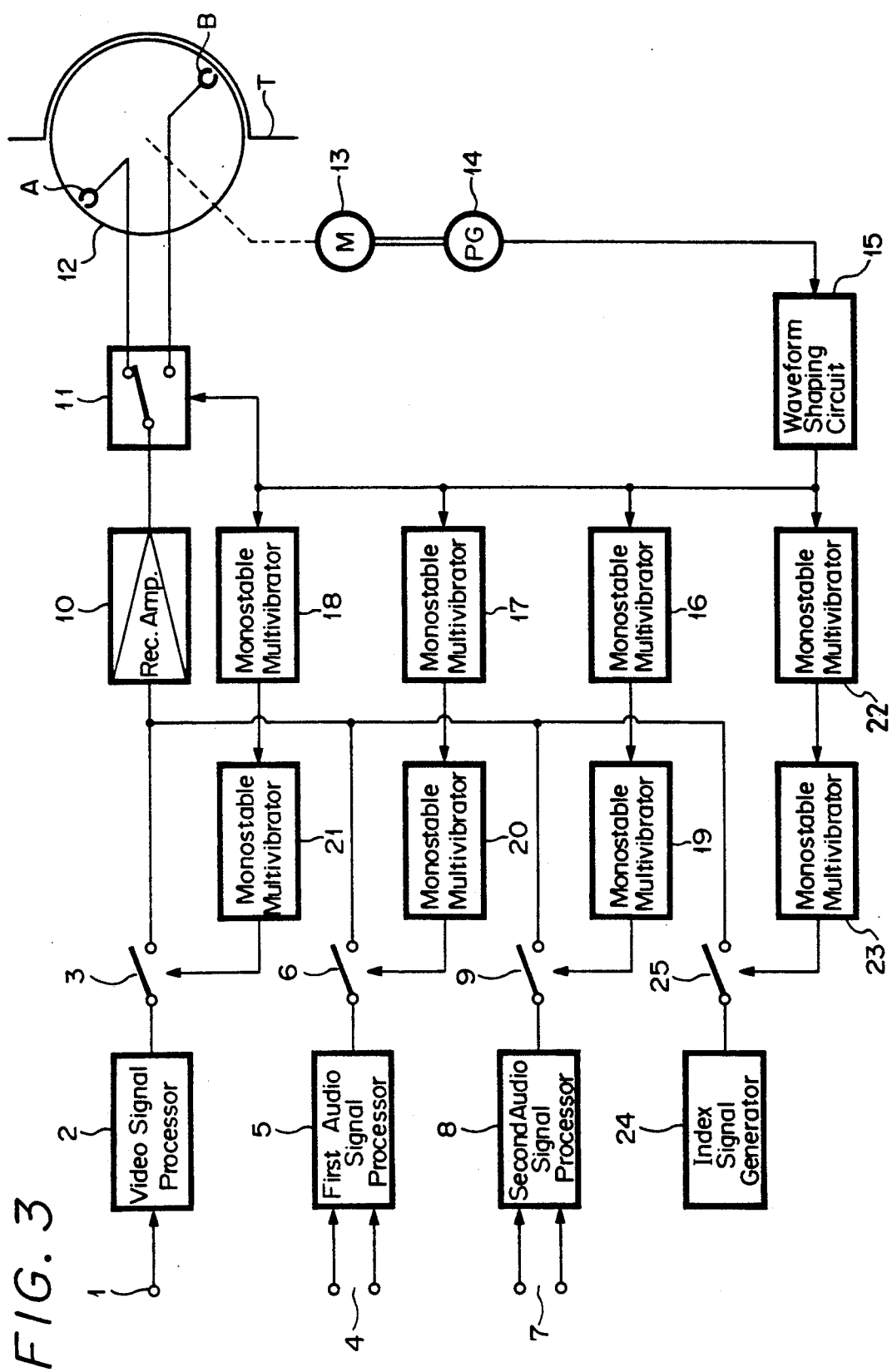
FIG. 3 is a block diagram illustrating an embodiment of a rotary head type recording apparatus according to the present invention.

FIG. 3 is a block diagram illustrating an embodiment of a video tape recording apparatus according to the present invention.

Referring now to FIG. 3, a video signal supplied to an input terminal 1 is applied to a switching unit 3 through a video signal processing circuit 2 which includes a time-base compression function. A first PCM (pulse code modulated) audio signal of two channels, for example, supplied to an input terminal 4 is applied to a switch unit 6 through a first audio signal processing circuit 5 which includes a time-base compression function. A second PCM audio signal of two channels, for example, supplied to an input terminal 7 is applied to a switch unit 9 through a second audio signal processing circuit 8 which includes a time-base compression function. The audio and video signals passed through the switch units 3, 6 and 9 are supplied to heads A and B provided on a rotary head drum 12 through a recording amplifier 10 and a change-over switch 11 to thereby be recorded on a magnetic tape T wound around the rotary head drum 12 to form skewed tracks.

In connection with a driving motor 13 for driving the rotary head drum 12, a pulse generator (PG) 14 is provided to enable detection of a rotary phase of the rotary head drum 12. The pulse generator 14 generates one pulse signal per rotation of the drum, as shown in FIG. 4A, and supplies the pulse signal to a waveform shaping circuit 15, which in turn forms a signal whose polarity is inverted at every half revolution of the rotary head drum 12, as shown in FIG. 4B. The signal from the waveform shaping circuit 15 is supplied to the change-over switch 11 to thereby change it over.

The output signal from the waveform shaping circuit 15 is supplied to monostable multivibrators 16, 17 and 18 which in turn respectively generate signals as shown in FIGS. 4C, 4E and 4G corresponding to recording starting points on the tape for the second and first audio signals and the video signal, respectively. Further, the output signals from the monostable multivibrators 16, 17 and 18 are respectively supplied to monostable multivibrators 19, 20 and 21 which in turn generate signals as shown in FIGS. 4D, 4F and 4H corresponding to recording areas on the tape for the second and first audio signals and the video signal, respectively.

In this case, the length of a guard band area between the recording areas of the first audio signal and the video signal shown in FIGS. 4F and 4H is set to a required or demanded minimum value of $2aH$, thus permitting the length of a guard band area between the recording areas of the first and second audio signals shown in FIGS. 4F and 4D to be as large as $(2b-2a)H$.

The output signal from the waveform shaping circuit 15 is also supplied to a monostable multivibrator 22 which in turn generates a signal as shown in FIG. 4I corresponding to a recording starting point on the tape for an index signal. The output signal from the monostable multivibrator 22 is supplied to a monostable multivibrator 23 which then generates a signal as shown in FIG. 4J corresponding to a portion of the area between the recording areas of the first and second audio signals. The output signal from the monostable multivibrator 23 is supplied as a control signal to a switch unit 25 to which the index signal is supplied from an index signal forming circuit 24 and then the output signal from the switch unit 25 is applied to the recording amplifier 10.

Thus, the index signal is recorded in the guard band area between the recording areas of the first and second audio signals, which can be made large.

Namely, in this apparatus, suppose that a tolerance is $\pm aH$ (H is the horizontal synchronizing period), a reference length of the guard band area is $bH$, and a total length of both of the guard band areas is $2bH$. If the length of the guard band area between the recording areas of the video signal and the first audio signal is constrained to the demanded minimum value of $2aH$, then the length of the guard band area between the recording areas of the first and second audio signals will be $(2b-2a)H$, so that even if the tolerances for performing the after-recording and the recording of the index signal are taken into consideration, the length available for recording the index signal will be $(2b-6a)H$.

Now, this length of $(2b-6a)H$ is larger than the above-described conventional length of $(b-4a)H$ since $b$ is larger than $2a$.

Figure 5:
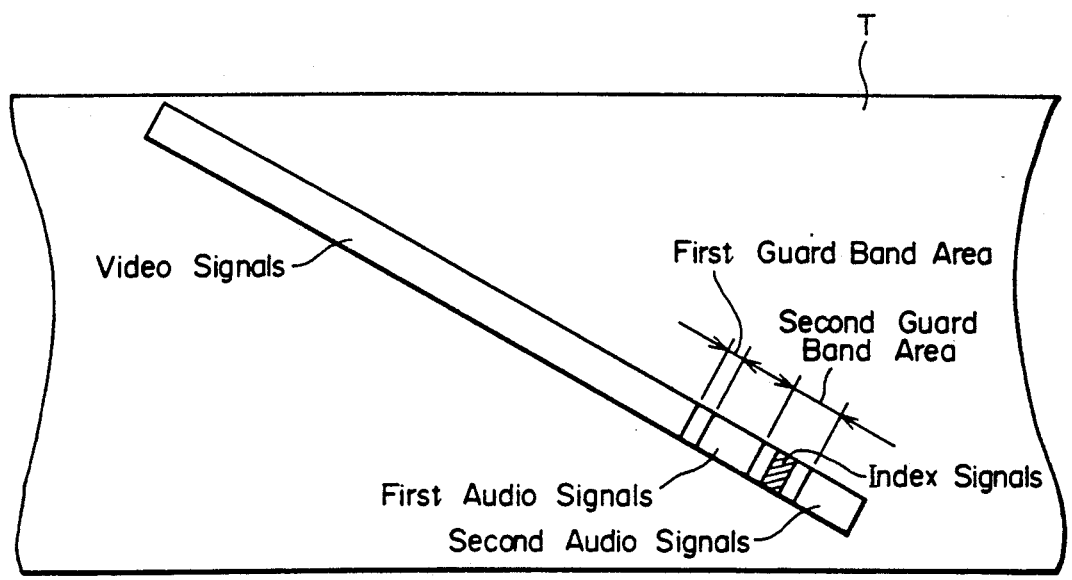
FIG. 5 is a diagram illustrating an example of a recording pattern of the embodiment.

Thus, a recording pattern shown in FIG. 5 can be formed on the tape T which allows the index signal as well as the video signal and the first and second audio signals to be recorded.

According to the video tape recording and/or reproducing apparatus of this embodiment, the length between the recording areas of the video signal and the audio signal can be made different from the length between the recording areas of the first and second audio signals, and further the recording area of the index signal is provided in the one of the guard band areas with these lengths which is longer than the other guard band area, so that a recording area for the index signal having a sufficient length can be provided without reducing the lengths of the recording areas for the video and audio signals and further the recording of the rewritable index signal can be performed with simple circuit configurations.

Alternatively, the length of the guard band area between the recording areas of the first and second audio signals may be set to the demanded minimum value of $2aH$ and the length of the guard band area between the recording areas of the video signal and the first audio signal may be set to $(2b-2a)H$.

The above-described embodiment may be modified in a manner so that, for example, the video signal and the first audio signal are always recorded simultaneously, that is, after-recording can be allowed only for the second audio signal, thereby making the length of the guard band area between the recording areas of the video signal and the first audio signal substantially zero. In this case, the length of the guard band area between the recording areas of the first and second audio signals will be 2bH, so that the index signal can be recorded in a larger area.

According to the present invention, the length between the recording areas of the video signal and the audio signal can be made different from the length between the recording areas of the first and second audio signals, and further the recording area of the index signal is provided in one of the guard band areas with these lengths which is longer than the other guard band area, so that a recording area for the index signal having a sufficient length can be provided without reducing the lengths of the recording areas for the video and audio signals and further the recording of the rewritable index signal can be performed with simple circuit configurations.

Having described the preferred embodiment of the invention, and various modifications thereof, with reference to the accompanying drawings, it is to be understood that the invention is not limited to this precise embodiment and the described modifications and that various changes and further modifications thereof may be effected by one skilled in the art without departing from the spirit or scope of the invention as defined in the appended claims.

We claim as our invention:

1. A video tape recording apparatus comprising:
   rotary magnetic head means for scanning skewed recording tracks on a video tape;
   means for recording a video signal in each of said recording tracks scanned by said rotary magnetic head means;
   means for providing a first guard band area having a first predetermined length in each of said recording tracks next too the video signal recorded in the respective recording track;
   means for recording a first audio signal next to said first guard band area in each of said recording tracks scanned by said rotary magnetic head means;
   means for providing a second guard band area having a second predetermined length different from said first predetermined length next to said first audio signal in each of said recording tracks;
   means for recording a second audio signal next to said second guard band area in each of said recording tracks scanned by said rotary magnetic head means; and
   means for recording an index signal in a longer one of said first and second guard band areas in each of said recording tracks scanned by said rotary magnetic head means.

2. A video tape recording apparatus as in claim 1, wherein said index signal is recorded in said first guard band area between said video signal and said first audio signal by said rotary magnetic head means.

3. A video tape recording apparatus as in claim 1, wherein said index signal is recorded in said second guard band area between said first audio signal and said second audio signal by said rotary magnetic head means.

4. A video tape recording apparatus according to any one of the preceding claims, wherein said first and second audio signals are pulse code modulated (PCM) audio signals.

5. A video tape recording apparatus as in claim 1, wherein the length of the longer of said first and second guard band areas is substantially equal to twice the length of the shorter of said first and second guard band areas plus the length of an area in which said index signal is recorded.

6. A video tape recording apparatus comprising:
   rotary magnetic head means for scanning skewed recording tracks on a video tape;
   means for recording a video signal in each of said recording tracks scanned by said rotary magnetic head means;
   means for providing a first guard band area having a first predetermined length in each of said recording tracks following and adjacent to the video signal recorded in the respective recording track;
   means for recording a first audio signal in each of said recording tracks following and adjacent to said first guard band area;
   means for providing a second guard band area having a second predetermined length in each of said recording tracks following and adjacent to said first audio signal;
   means for recording a second audio signal in each of said recording tracks following and adjacent to said second guard band area; and
   means for recording an index signal in an index signal area in a longer one of said first and second guard band areas, the longer guard band area having a length substantially equal to twice the length of the other guard band area plus the length of said index signal area.

* * * * *